(12) United States Patent
Ihata et al.

(10) Patent No.: US 7,520,675 B2
(45) Date of Patent: Apr. 21, 2009

(54) ROLLING BEARING ASSEMBLY HAVING MAGNET TO PREVENT BRITTLE FLAKING

(75) Inventors: Kouichi Ihata, Okazaki (JP); Tsutomu Shiga, Nukata-gun (JP); Atsushi Umeda, Okazaki (JP)

(73) Assignee: Denso Corporation, Kariya (JP)

( * ) Notice: Subject to any disclaimer, the term of this patent is extended or adjusted under 35 U.S.C. 154(b) by 324 days.

(21) Appl. No.: 11/365,816

(22) Filed: Mar. 2, 2006

(65) Prior Publication Data

US 2006/0210206 A1  Sep. 21, 2006

(30) Foreign Application Priority Data

Mar. 18, 2005  (JP) .............................. 2005-079931

(51) Int. Cl.
  *F16C 19/00* (2006.01)
(52) U.S. Cl. ..................................... 384/446
(58) Field of Classification Search ................. 384/446
  See application file for complete search history.

(56) References Cited

U.S. PATENT DOCUMENTS

| | | | | |
|---|---|---|---|---|
| 1,730,424 A | * | 10/1929 | Harrison | 384/446 |
| 2,922,681 A | * | 1/1960 | Bayre | 384/446 |
| 3,011,842 A | | 12/1961 | Norris | |
| 3,016,274 A | * | 1/1962 | Norris | 384/446 |
| 3,977,739 A | | 8/1976 | Moskowitz et al. | |
| 4,303,281 A | * | 12/1981 | Irby | 310/90.5 |
| 5,829,889 A | * | 11/1998 | Kerr et al. | 384/446 |
| 6,093,989 A | * | 7/2000 | Joffe | 384/8 |

FOREIGN PATENT DOCUMENTS

| | | |
|---|---|---|
| DE | 23 59 389 | 6/1975 |
| FR | 2 768 272 | 3/1999 |
| JP | B 45-6966 | 4/1970 |
| JP | A 57-001820 | 1/1982 |
| JP | A 60-26815 | 2/1985 |
| JP | A 09-065620 | 3/1997 |
| JP | A 2002-227854 | 8/2002 |

OTHER PUBLICATIONS

Minoru Umemoto; "Nanocrystallization by heavy deformation and white etching area in bearing steels"; Sanyo Techincal Report vol. 11 (2004) No. 1; Jun. 2004; pp. 13-27.
K. Tamada et al; "Occurrence of brittle flaking on bearings used for automotive electrical instruments and auxiliary devices"; Wear 199 (1996); Jun. 26, 1995; pp. 245-252.
European Patent Office communication, mailed on Sep. 5, 2008.
Japanese Office Action mailed Oct. 22, 2008.

* cited by examiner

*Primary Examiner*—Thomas R Hannon
(74) *Attorney, Agent, or Firm*—Oliff & Berridge, PLC (57) ABSTRACT

A rolling bearing assembly according to the present invention includes an inner ring, an outer ring, a plurality of rolling elements interposed between the inner and outer rings, and a magnet provided to cause magnetic attraction between the rolling elements and at least one of the inner and outer rings. With the magnetic attraction, it is possible to avoid any collision between the rolling elements and the inner and outer rings, thereby preventing brittle flaking from occurring in the rolling bearing assembly.

12 Claims, 8 Drawing Sheets

ROLLING BEARING ASSEMBLY HAVING MAGNET TO PREVENT BRITTLE FLAKING

CROSS-REFERENCE TO RELATED APPLICATION

This application is based on and claims priority from Japanese Patent Application No. 2005-79931, filed on Mar. 18, 2005, the content of which is hereby incorporated by reference into this application.

BACKGROUND OF THE INVENTION

1. Technical Field of the Invention

The present invention relates generally to bearings and automotive accessories. More particularly, the invention relates to a rolling bearing assembly for use in an automotive accessory, which includes a magnet to prevent the surfaces of rolling elements and the raceway surfaces of inner and outer rings thereof from brittle flaking.

2. Description of the Related Art

In recent years, rolling bearings of automotive accessories, such as an alternator and an air conditioning compressor driven by an engine in an automobile, have come to be used under severe operating conditions (for example, high temperature and vibration), resulting in a new type of bearing damage, called "brittle flaking".

Brittle flaking may occur at any area of the surfaces of the rolling elements and the raceway surfaces of the inner and outer rings of the rolling bearing. Further, brittle flaking has a feature that the time period from the start to finish thereof is very short, for example, only about 0.1 to 1% of that of a general rolling contact fatigue.

Up to now, the mechanism of brittle flaking has been not made clear. Accordingly, only temporary expedients that are not based on sound scientific grounds have been employed to solve the problem of brittle flaking, in other words, no fundamental solution to the problem has been provided.

According to the results of a rolling bearing reliability test, among the accessories of an automobile, occurrence rate of brittle flaking was highest in the alternator. As is well known in the art, the alternator had the highest speed increasing ratio with respect to the engine and a large rotational inertia, and thus had the largest equivalent inertia which is proportional to the second power of the speed increasing ratio. Further, occurrence rate of brittle flaking was high in the accessories when those were driven by the engine via a Poly-V belt, with which the belt tension was set tight as is well known in the art. Furthermore, occurrence rate of brittle flaking was high in the accessories when there was provided an autotensioner in the belt drive system to prevent slack of the belt via which the engine drove the accessories.

One theory explains, based on the fact that the hydrogen content in grease included in rolling bearings damaged due to brittle flaking is high, the mechanism of brittle flaking such that the hydrogen generated due to decomposition of the grease diffuses into the rolling elements and the outer ring, thereby causing the surfaces thereof to flake. (With regard to the theory, a further reference can be made to: 1) Minoru Umemoto, Sanyo Technical Report, Vol. 11, No. 1 (2004), "Nanocrystallization by Heavy Deformation and White Etching Area in Bearing Steels"; 2) K. Tamada and H. Tanaka, Wear 199 (1996), "Occurrence of Brittle Flaking on Bearings Used for Automotive Electrical Instruments and Auxiliary Devices"; and 3) Japanese Patent First Publication No. 2002-227854.)

Further, according to the theory, a new type of grease has been developed which includes an additive to form electrical insulation films on raceway surfaces of rolling bearings, thereby preventing brittle flaking from occurring. By means of the new grease, a certain decrease in occurrence rate of brittle flaking has been achieved; however, it is still impossible to completely prevent occurrence of brittle flaking only by the help of the grease. Indeed, in some cases, brittle flaking occurred even with the insulation films formed on the raceway surfaces of the rolling bearings. Moreover, on the surfaces damaged by brittle flaking, the evidence of a plastic deformation was found.

Accordingly, though grease does have influence on the occurrence of brittle flaking, it may not be effective to solve the problem of brittle flaking by developing a newer type of grease aiming to form insulation films on raceway surfaces of rolling bearings.

SUMMARY OF THE INVENTION

The present invention has been made in view of the above-mentioned circumstances.

Figure 9:
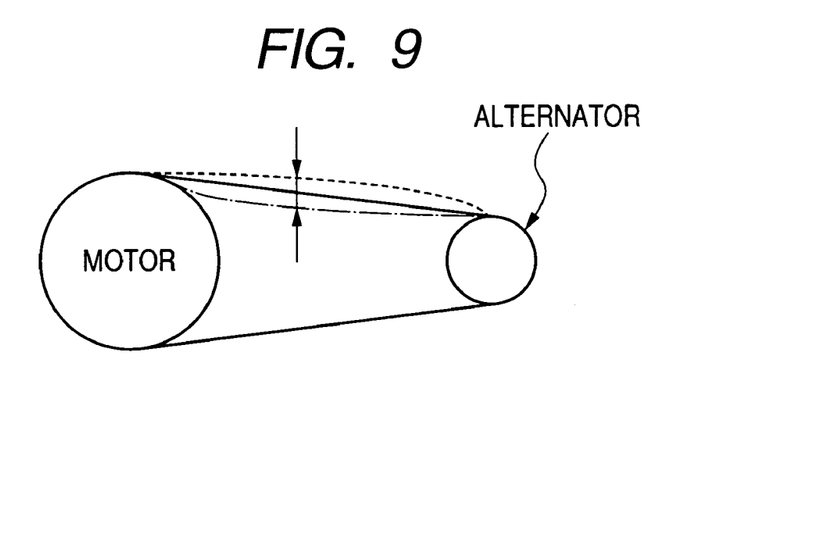
FIG. 9 is a schematic view illustrating a rotational fluctuation test.

The inventors of the present invention have found that the phenomenon of brittle flaking can be reproduced via a rotational fluctuation test as illustrated in FIG. 9.

Figure 10:
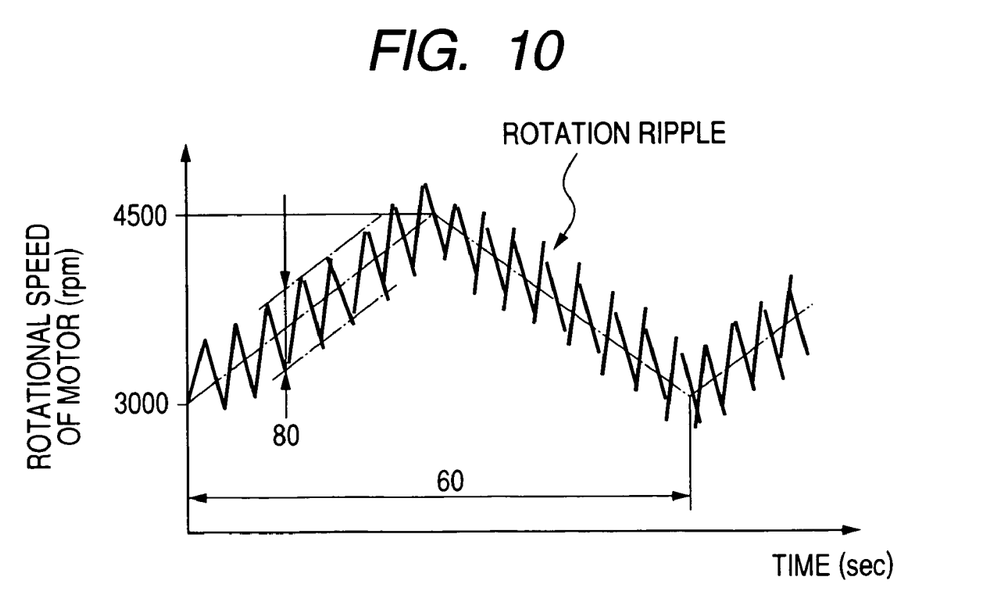
FIG. 10 is a graph showing a rotation ripple applied in the rotational fluctuation test of FIG. 9.

In the test, an automotive alternator was driven by a motor, which simulated a four-cylinder automotive engine, via a belt. The motor was so controlled to apply a rotation ripple that had an average rotational fluctuation rate of 2% and a frequency being equal to two times of the rotational speed of the motor. For example, when the rotational speed of the motor was 600 rpm (i.e., 600/60=10 Hz), the frequency of the rotation ripple was 20 Hz. The change in rotational speed of the motor with time is shown in FIG. 10. Additionally, the belt tension was set to 300 to 500 N, which corresponds to the average belt tension of a belt drive system in an ordinary automobile.

Figure 11:
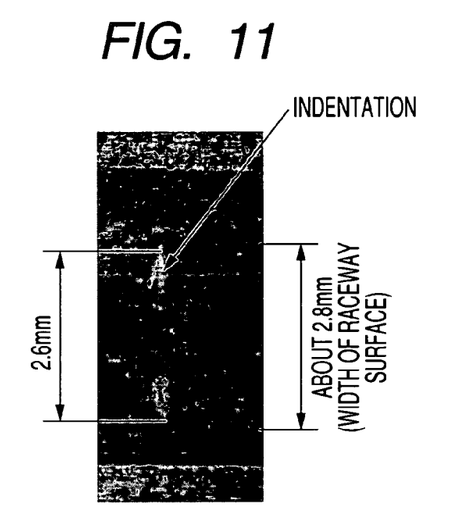
FIG. 11 is a picture showing a plastic deformation of a raceway surface of a rolling bearing by the rotational fluctuation test of FIG. 9.

The inventors have further found that an indentation was formed through the test on a raceway surface of a rolling bearing of the alternator, as shown in FIG. 11. Since no load greater than the yield stress of the raceway surface was imposed thereon during the test, it was normally impossible to result in such an indentation. Accordingly, the inventors have hypothesized that a lubrication failure occurred during the test on the raceway surface, which further caused the indentation thereon.

According to Elastohydrodynamic Lubrication (EHL) theory, when there is a difference in rotational speed between a rolling element and the inner or outer ring of a rolling bearing, an elastohydrodynamic lubrication film will be developed between the surface of the rolling element and the raceway surface of the inner or outer ring, thereby preventing plastic deformation of the two members.

Figure 12:
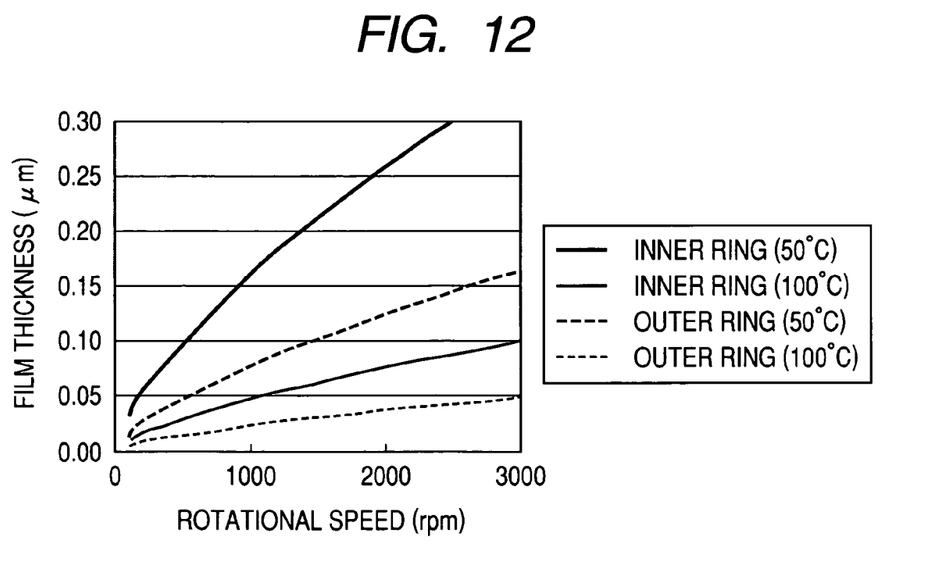
FIG. 12 is a graph showing the relationship between the thickness of elastohydrodynamic lubrication films formed between components of a rolling bearing and the rotational speed of a shaft supported by the rolling bearing.

In normal operating conditions of the rolling bearing of the above-tested alternator, elastohydrodynamic lubrication films were formed between the surfaces of the rolling elements and the raceway surfaces of the inner and outer rings. Further, as shown in FIG. 12, the thickness of the elastohydrodynamic lubrication films increased with the rotational speed of the alternator (i.e., the rotational speed of the inner ring of the rolling bearing).

However, in certain abnormal operating conditions of the rolling bearing, for example, in a condition where the rolling elements have the same rotational speed as the inner or outer ring, the elastohydrodynamic lubrication films formed between the surfaces of the rolling elements and the raceway surface of the inner or outer ring would be broken down.

Further, if one of the rolling elements collided against the inner or outer ring without the elastohydrodynamic lubrication film therebetween, the collision would result in a plastic deformation (i.e., an indentation) on the surface of the rolling element and/or the raceway surface of the inner or outer ring. The plastic deformation would further give rise to brittle flaking of the plastically-deformed surface.

Based on the above hypothesis, the inventors have considered that occurrence of brittle flaking in a rolling bearing can be prevented by avoiding any collision between the rolling elements and the inner and outer rings in absence of elastohydrodynamic lubrication films therebetween. The inventors have further considered that a magnet can be used to cause magnetic attraction between the rolling elements and at least one of the inner and outer rings, thereby avoiding any collision between the rolling elements and the inner and outer rings.

It is, therefore, a primary object of the present invention to provide a rolling bearing assembly for use in an automotive accessory, which includes a magnet to prevent the surfaces of rolling elements and the raceway surfaces of inner and outer rings thereof from brittle flaking.

According to the present invention, a rolling bearing assembly includes an inner ring, an outer ring, a plurality of rolling elements interposed between the inner and outer rings, and a magnet provided to cause magnetic attraction between the rolling elements and at least one of the inner and outer rings.

With such a configuration, it becomes possible to avoid any collision between the rolling elements and the inner and outer rings by means of the magnetic attraction, thereby preventing brittle flaking from occurring in the rolling bearing assembly.

In the above rolling bearing assembly, the rolling elements may each have a ball shape.

In one embodiment of the present invention, the rolling bearing assembly further includes a lubricant and a seal interposed between the inner and outer rings to keep the lubricant from escaping out of the rolling bearing assembly. Moreover, all the inner and outer rings and rolling elements are made of a magnetic material, and the seal includes a metal core that works as the magnet to cause magnetic attraction between the rolling elements and the inner and outer rings.

In another embodiment of the present invention, the inner ring is made of a magnetic material, and the rolling elements work as the magnet to cause magnetic attraction between the rolling elements and the inner ring.

In yet another embodiment of the present invention, the outer ring is made of a magnetic material, and the rolling elements work as the magnet to cause magnetic attraction between the rolling elements and the outer ring.

In yet another embodiment of the present invention, the rolling elements are made of a magnetic material, and the inner ring works as the magnet to cause magnetic attraction between the rolling elements and the inner ring.

In yet another embodiment of the present invention, the rolling elements are made of a magnetic material, and the outer ring works as the magnet to cause magnetic attraction between the rolling elements and the outer ring.

In yet another embodiment of the present invention, the rolling bearing assembly is employed in an automotive accessory to support a shaft of the accessory.

The automotive accessory may include a plate-shaped bearing retainer that is made of a magnetic material and has first and second side faces disposed perpendicular to the axial direction of the accessory. Further, all the inner and outer rings and rolling elements may be made of a magnetic material and mounted to the first side face of the bearing retainer, and the magnet may have a ring shape and be mounted to the second side face of the same to cause magnetic attraction between the rolling elements and the inner and outer rings.

Otherwise, the outer ring and rolling elements may be made of a magnetic material, and the automotive accessory may include a hollow cylindrical bearing box that is made of a magnetic material and extends in the axial direction of the accessory. Further, the inner and outer rings and rolling elements may be mounted in the bearing box, and the magnet may have a ring shape and be mounted on the outer surface of the bearing box to cause magnetic attraction between the rolling elements and the outer ring.

The automotive accessory may be an automotive alternator.

The automotive accessory may be driven by an automotive engine in a serpentine belt drive system. Further, the automotive engine may drive four or more automotive accessories in the serpentine belt drive system.

The automotive accessory may be driven by an automotive engine in a belt drive system that includes an autotensioner.

The automotive accessory may be driven by an automotive engine via a Poly-V belt.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

The preferred embodiments of the present invention will be described hereinafter with reference to FIGS. 1-8.

It should be noted that, for the sake of clarity and understanding, identical components having identical functions in different embodiments of the invention have been marked, where possible, with the same reference numerals in each of the figures.

First Embodiment

Figure 1:
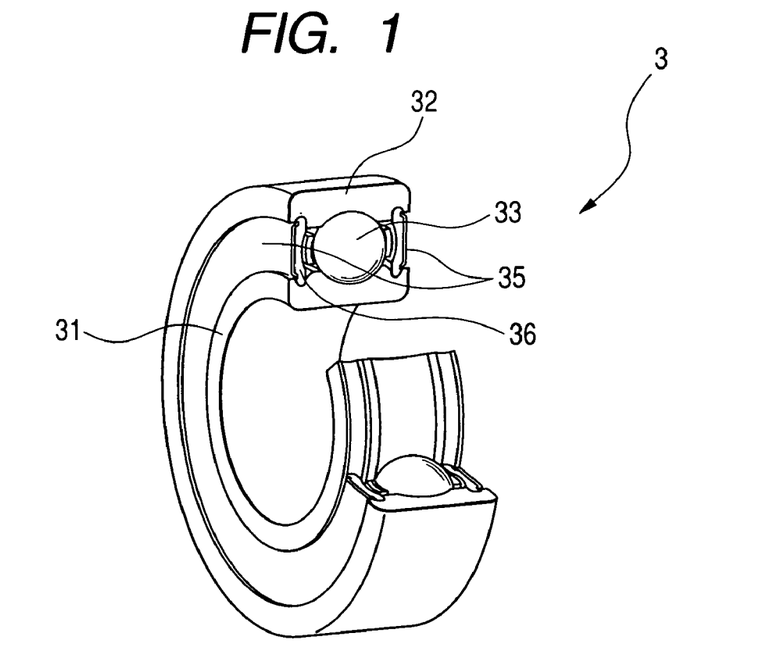
FIG. 1 is a perspective and partially broken-away view of a rolling bearing assembly according to the first to fifth embodiments of the invention.
Figure 2:
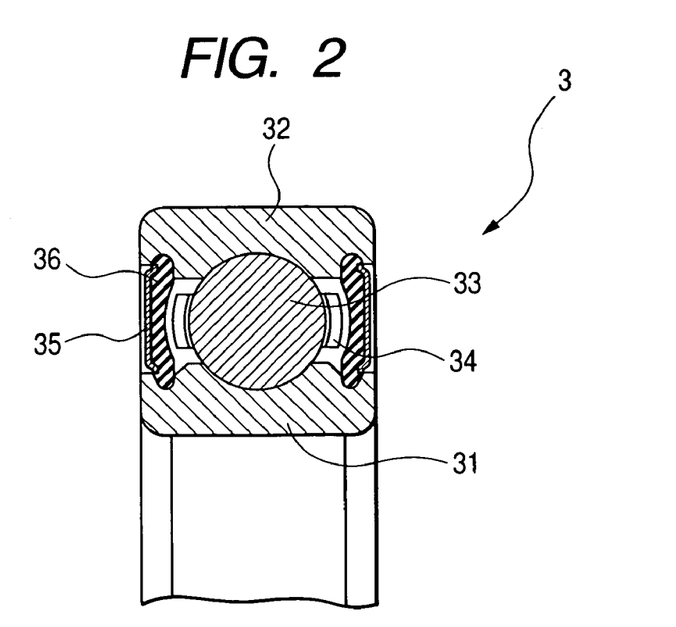
FIG. 2 is a cross-sectional view of the rolling bearing assembly of FIG. 1.
Figure 3:
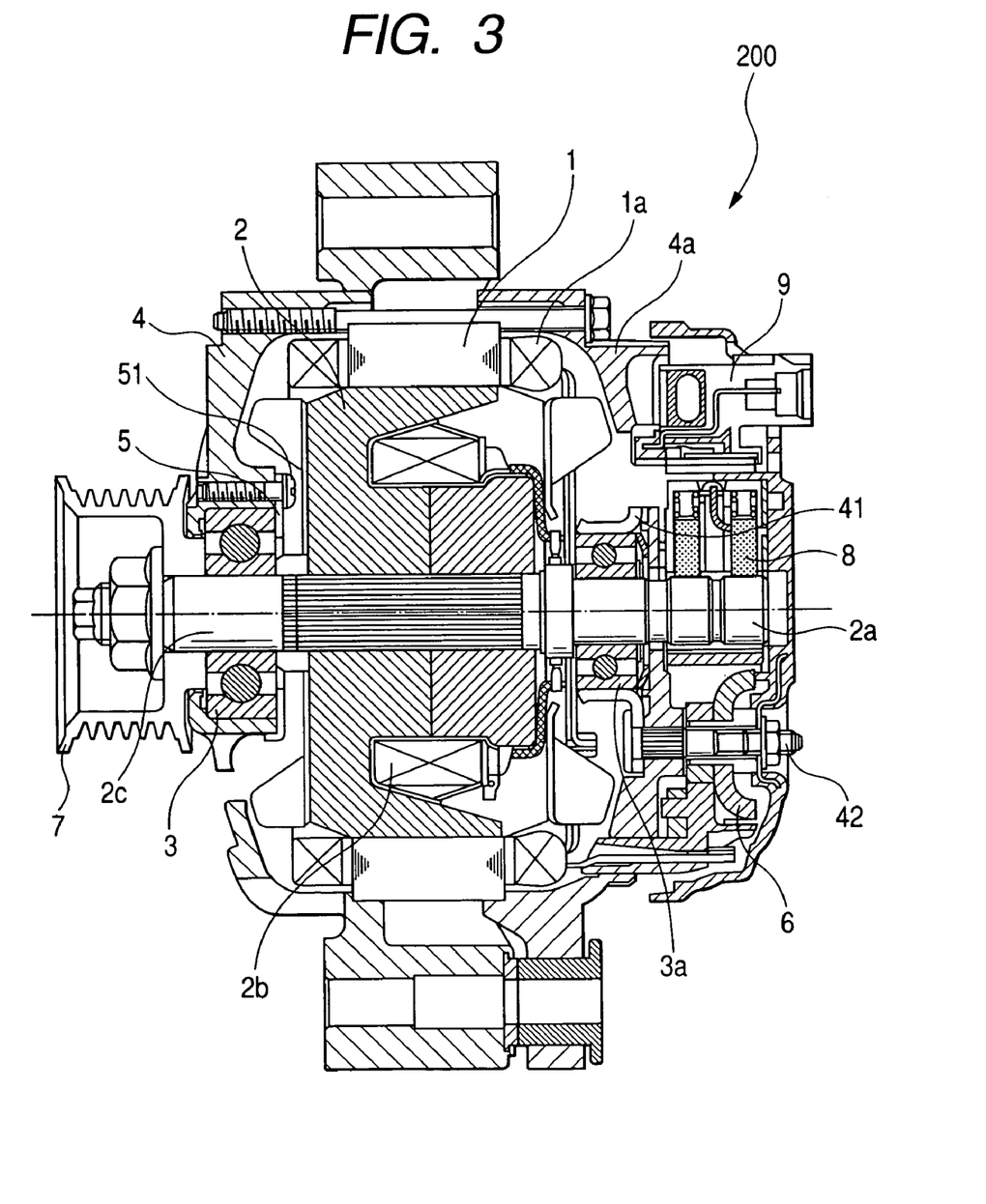
FIG. 3 is a partially cross-sectional view of an automotive alternator in which the rolling bearing assembly of FIG. 1 is incorporated.
Figure 4:
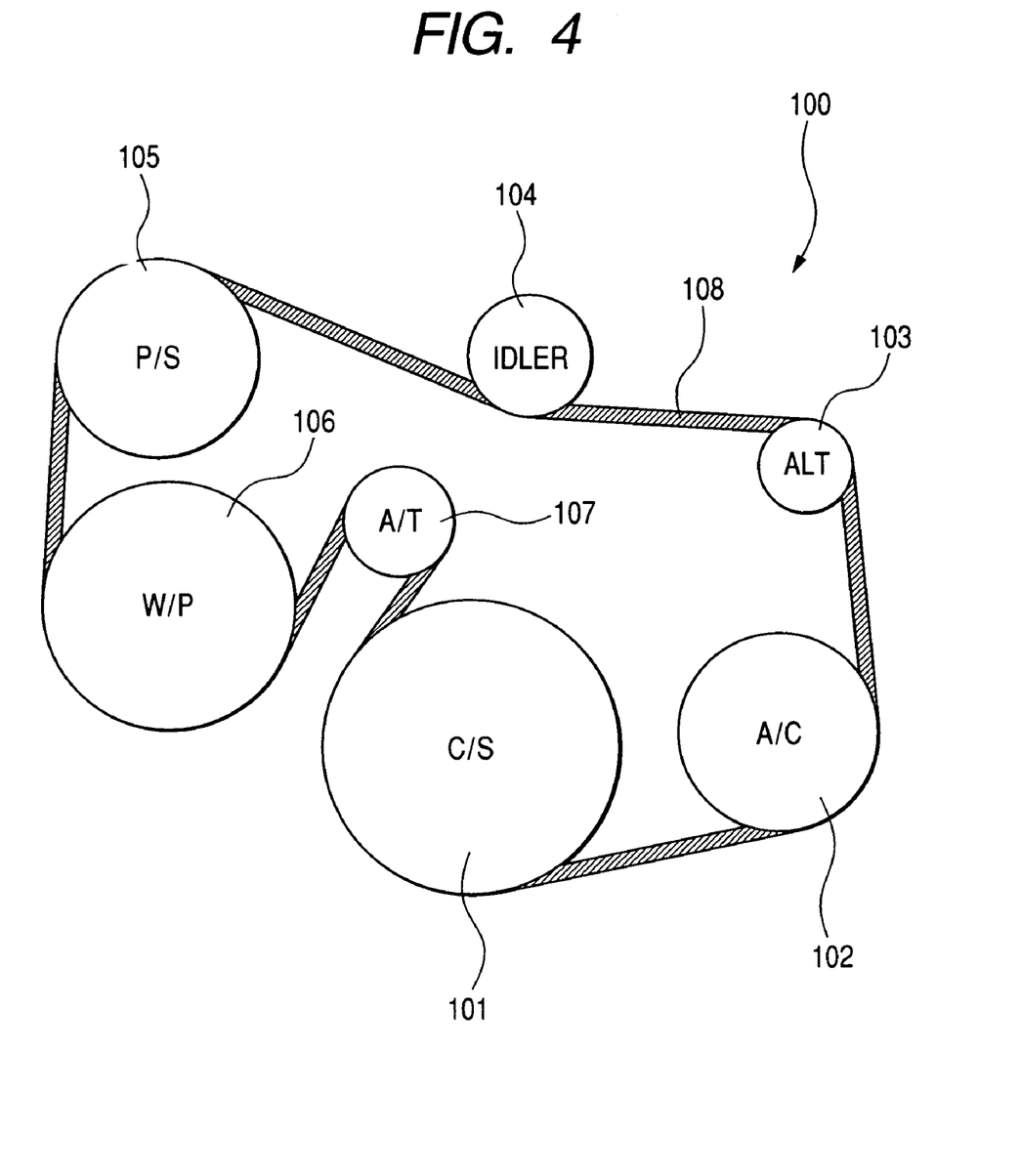
FIG. 4 is a schematic view of a serpentine belt drive system in which the automotive alternator of FIG. 3 is incorporated.

FIGS. 1 and 2 show the overall structure of a rolling bearing assembly 3 according to the first embodiment of the present invention. FIG. 3 shows the overall structure of an automotive alternator 200 in which the rolling bearing assembly 3 is incorporated. FIG. 4 shows the overall configuration of a serpentine belt drive system 100 for an automobile, in which the alternator 200 is incorporated.

As shown in FIG. 4, in the serpentine belt drive system 100, an internal combustion engine drives six automotive accessories (or auxiliary machines) via a belt 108.

Specifically, in the serpentine belt drive system 100, a pulley 101 is mounted on a crank shaft (C/S) of the engine; a pulley 102 is mounted on a rotary shaft of an air conditioning compressor (A/C); a pulley 103 is mounted on a rotary shaft of the automotive alternator 200 (ALT); a pulley 104 is mounted on a rotary shaft of an idler (Idler); a pulley 105 is mounted on a rotary shaft of an oil pump for power steering (P/S); a pulley 106 is mounted on a rotary shaft of a water pump (W/P); and a pulley 107 is mounted on a rotary shaft of an autotensioner (A/T). The pulleys 101-107 are connected together via the belt 108, so that rotating power can be transmitted from the engine to the six accessories.

Each of the accessories has a given gear ratio with respect to the engine. For example, the diameter ratio between the pulley 101 of the engine and the pulley 103 of the automotive alternator 200 is set to 3.3, so that the automotive alternator 200 has a speed increasing ratio of 3.3 with respect to the engine. The belt 108 is a Poly-V belt with six grooves. The autotensioner is of torsion spring type and provided on the slack side of the pulley 101 of the engine. The belt tension on the slack side of the pulley 101 is kept constant by the autotensioner at, for example, 400 N.

Referring to FIG. 3, the automotive alternator 200 includes a stator 1, which includes a three-phase stator winding 1a, and a rotor 2 that includes a field winding 2b for creating a rotating magnetic field for the stator winding 1a.

The rolling bearing assembly 3 is provided on the front-side (i.e., the pulley-side) of the rotor 2. On the rear-side (i.e., the opposite side to the pulley) of the rotor 2, there is provided another rolling bearing assembly 3a that has the same structure as the front-side rolling bearing assembly 3. The rolling bearing assemblies 3 and 3a together support a shaft 2c of the rotor 2 (i.e., the rotary shaft of the automotive alternator 200).

A front-side housing 4 and a rear-side housing 4a are provided to accommodate the stator 1 and rotor 2. In addition, the stator 1 is supported by the front-side housing 4.

A plate-shaped bearing retainer 5 is fixed to the front-side housing 4 by means of a screw 51, thereby retaining the front-side rolling bearing assembly 3. On the other hand, a hollow cylindrical bearing box 41 is provided which retains therein the rear-side rolling bearing assembly 3a.

A knurled bolt 42 is provided to fix the bearing box 41 to the rear-side housing 4a.

A rectifier 6 is also fixed to the rear-side housing 4a via the knurled bolt 42. The rectifier 6 is electrically connected to the stator winding 1a and configured to convert a three-phase AC power outputted from the stator winding 1a to a DC power.

Brushes 8 and slip rings 2a together form an excitation mechanism by which field current is supplied to the field winding 2b while the rotor 2 is rotating.

A voltage regulator 9 is provided to regulate an output voltage of the automotive alternator 200 by controlling the field current supply to the field winding 2b.

In addition, through supplying the field current to the field winding 2b, the shaft 2c of the rotor 2 is magnetized.

Referring now to FIGS. 1 and 2, the rolling bearing assembly 3 includes an inner ring 31, an outer ring 32, a plurality of rolling elements 33, a cage 34, and a pair of seals 35.

The rolling elements 33 are interposed between the inner and outer rings 31 and 32 and retained by the cage 34. In the present embodiment, the rolling elements 33 each have a ball shape. In other words, the rolling bearing assembly 3 comprises a ball bearing.

The seals 5 are respectively provided at opposite axial ends of the rolling bearing assembly 3. The seals 5 work to keep grease, which is filled in the interior of the rolling bearing assembly 3 as lubricant, from escaping out of the rolling bearing assembly 3. Each of the seals 5 includes a metal core 36 to secure rigidity thereof.

In the present embodiment, the metal core 36 of one of the seals 35 (for example, the left-side seal 35 in FIGS. 1 and 2) is made of a magnet, and the inner and outer rings 31 and 32 and the rolling elements 33 are made of a magnetic material.

With such a configuration, the magnet (i.e., the metal core 36) magnetizes the inner and outer rings 31 and 32 and the rolling elements 33, thereby causing magnetic attraction between the rolling elements 33 and the inner and outer rings 31 and 32. The magnetic attraction further enables the rolling elements 33 to keep constant radial and axial distances with the inner and outer rings 31 and 32.

Having described the overall structure of the rolling bearing assembly 3 according to the present embodiment, advantages thereof will be described with reference to FIGS. 7A-8B.

Figure 7A:
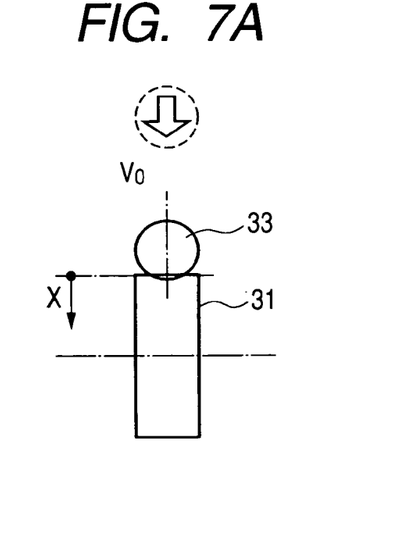
FIGS. 7A and 7B are schematic views illustrating a collision between a ball and the inner ring of a ball bearing.
Figure 7B:
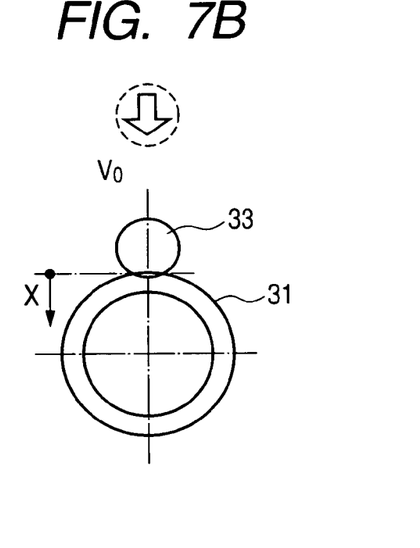

FIGS. 7A and 7B illustrate a collision of one of the balls 33 (i.e., the rolling elements 33) against the inner ring 31 in the radial direction with an initial speed $V_0$.

Suppose that the ball 33 has the same rotational speed as the inner ring 31. Further, suppose that the metal core 36 is not made of a magnet, in other words, there is no magnet provided in the rolling bearing assembly 3. Then, there would be no elastohydrodynamic lubrication film between the ball 33 and the inner ring 31, and thus the collision would result in plastic deformation on the surface of the ball 33 and the raceway surface of the inner ring 31.

Let X represent the moving distance of the center of the ball 33 from an initial position thereof in the radial direction. The initial position of the center of the ball 33 here represents the position thereof at which the ball 33 makes first contact with the inner ring 31. Further, let m represent the mass of the moving body. For example, when the ball 33 collides against the inner ring 31 by itself, m represents the mass of the ball 33. Otherwise, when the ball 33 collides against the inner ring 31 along with the outer ring 32 and the alternator housings 4 and 4a, m represents the sum of the masses of the ball 33, outer ring 32, and alternator housings 4 and 4a.

Figure 8A:
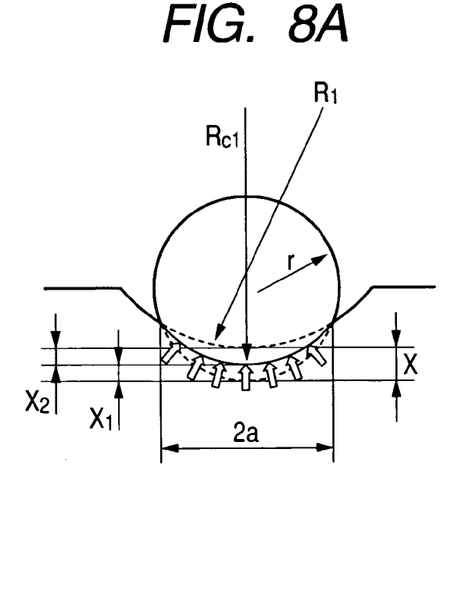
FIGS. 8A and 8B are schematic views illustrating a plastic deformation due to the collision of FIGS. 7A and 7B.
Figure 8B:
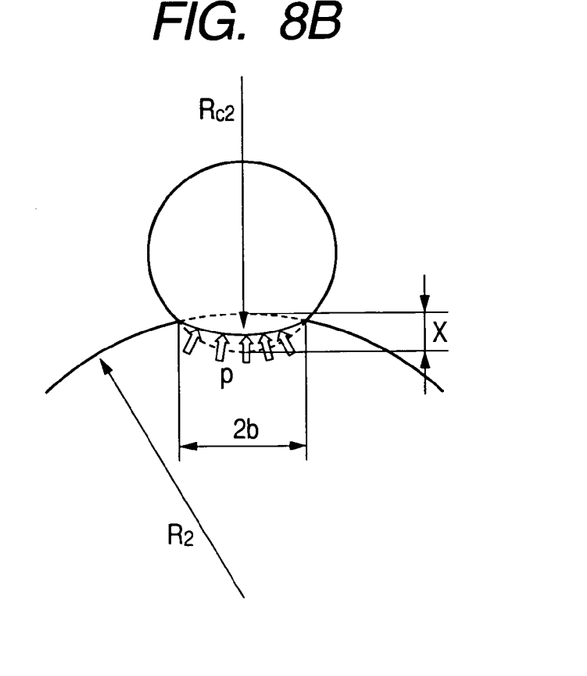

Referring to FIGS. 8A and 8B, let $X_1$ represent the amount of plastic deformation of the ball 33 during the collision.

Similarly, let $X_2$ represent the amount of plastic deformation of the inner ring 31 during the collision. Then, the total plastic deformation X of the two members is equal to $X_1+X_2$.

Further, let r represent the radius of the ball 33; let $R_1$ represent the curvature radius of the raceway surface of the inner ring 31 before the collision; let $R_2$ represent the minimum radius of the raceway of the inner ring 31 before the collision; let a and b respectively represent the major and minor radiuses of the contact ellipse between the ball 33 and the inner ring 31 after the plastic deformation; let $R_{c1}$ and $R_{c2}$ respectively represent the curvature radiuses of the interface of the ball 33 and the inner ring 31 on first and second reference planes after the plastic deformation. Here, the first reference plane is, as shown in FIGS. 7A and 8A, defined to include thereon the axis of the inner ring 31 and the center of the ball 33. On the other hand, the second reference plane is, as shown in FIGS. 7B and 8B, defined to extend perpendicular to the axis of the inner ring 31 through the center of the ball 33.

Then, since the materials of the ball 33 and the inner ring 31 have substantially the same hardness, the parameters $X_1$, $X_2$, and X has the following relationship:

$$X_1 = X_2 = \frac{X}{2} \tag{1}$$

Further, through an approximate computation based on the assumption that a is less than both r and $R_1$ and b is less than both r and $R_2$, the fowling geometric relationships can be obtained:

$$a^2 \cong \frac{2X}{\frac{1}{r} - \frac{1}{R_1}} \tag{2A}$$

$$b^2 \cong \frac{2X}{\frac{1}{r} + \frac{1}{R_2}} \tag{2B}$$

$$R_{c1} = \frac{2rR_1}{R_1 + r} \tag{3A}$$

$$R_{c2} = \frac{2rR_2}{R_2 - r} \tag{3B}$$

It should be noted that the above relationships can also be applicable to a collision of the ball 33 against the outer ring 32, through substituting $-R_2$ for $R_2$.

As can be seen from the above equations 2A-3B, the contact ellipse (represented by a and b) and the interface (represented by $R_{c1}$ and $R_{c2}$) between the ball 33 and the inner ring 31 change with the total plastic deformation X.

The total plastic deformation X can be determined as follows. Let P represent the contact pressure at the interface between the inner ring 31 and the ball 33, then the force of restitution of the inner ring 31 is equal to $P\pi ab$. Accordingly, the equation of motion for the moving body can be expressed as:

$$m\ddot{X} = -P\pi ab \tag{4}$$

In addition, according to a research by Hutchings, the contact pressure P can be determined by the following equation:

$$P = C'Y \tag{5},$$

where, Y is the yield stress of the inner ring 31, and C' is a constant.

For a plastic deformation of a ball, the constant C' is about 3. In other cases, for example, in a research paper by Taper, the constant C' is about 2.8 regardless of the material of the plastically-deformed body.

Through incorporating the equations 2A and 2B into the equation 4, the equation of motion for the moving body can be rewritten as follows:

$$\ddot{X} = -\frac{2\pi rP}{m}\sqrt{\frac{R_1 R_2}{(R_1 - r)(R_2 + r)}} X \tag{6}$$

The above equation 6 represents a simple harmonic motion. The solution of the equation 6 with the initial condition that $\ddot{X}=0$ and $\dot{X}=V_0$ when $t=0$ can be expressed as:

$$X = \frac{V_0}{\omega_p}\sin\omega_p t, \tag{7}$$

where $$\omega_p = \sqrt{\frac{2\pi rP}{m}\sqrt{\frac{R_1 R_2}{(R_1 - r)(R_2 + r)}}} \tag{8}$$

The loading time $t_p$, which is the time period from the start to finish of the collision, is one fourth of the frequency of the simple harmonic motion represented by the equation 6. Accordingly, the loading time $t_p$ can be expressed as:

$$t_p = \frac{\pi}{2\omega_p} \tag{9}$$

Using the above-described equation 7, it is possible to determine the total plastic deformation X at any time instant t(0<t<tp). Further, using the equations 2A and 2B, it is possible to determine the contact ellipse between the ball 33 and the inner ring 31 at that time instant. After the loading time $t_p$, the ball 33 will rebound from the inner ring 31, as to which description is omitted here.

In a conventional rolling bearing, a collision of one of the rolling elements against the inner or outer ring without an elastohydrodynamic lubrication film therebetween will result in a plastic deformation on the surface of the rolling bearing and/or the raceway surface of the inner or outer ring. Further, the plastic deformation will cause brittle flaking of the plastically-deformed surface.

In comparison, in the rolling bearing assembly 3 according to the present embodiment, the metal core 36 of one of the seals 35 is made of a magnet, which causes magnetic attraction between the rolling elements 33 and the inner and outer rings 31 and 32. The magnetic attraction further enables the rolling elements 33 to keep constant radial and axial distances with the inner and outer rings 31 and 32, thereby avoiding any collision therebetween. Consequently, occurrence of brittle flaking in the rolling bearing assembly 3 is prevented.

In addition, when a conventional rolling bearing is used in the automotive alternator 200, the field current supply to the field winding 2b of the rotor 2 may magnetize the inner ring of the rolling bearing as well as the shaft 2c of the rotor 2. However, the magnetomotive force of the field winding 2b is generally not large enough to cause magnetic attraction between the inner ring and the rolling elements, and thus it is difficult to avoid any collision between the rolling elements and the inner and outer rings.

The rolling bearing assembly 3 according to the present embodiment is advantageous especially in the following cases.

1) When employed in an automotive accessory, which has a large inertia and a large speed increasing ratio with respect to the engine driving it, such as the automotive alternator 200. The automotive accessory accordingly has a large equivalent inertia, so that it is easy for the automotive accessory to behave unstably. The unstable behavior of the automotive accessory may induce a collision between the components of a rolling bearing employed therein, thereby causing brittle flaking to occur in the rolling bearing.

2) When used in a serpentine belt drive system, such as the one shown in FIG. 4. In a serpentine belt drive system, a plurality of rotating machines are connected together via a single belt. Consequently, it is easy for rotation of the machines to become unstable. Moreover, the probability of occurrence of resonances among the machines and the belt is high. The rotational and vibrational instabilities in the serpentine belt drive system may induce a collision between the components of a rolling bearing used therein, thereby causing brittle flaking to occur in the rolling bearing. Especially, when the serpentine belt drive system includes five or more rotating machines, it is easier for brittle flaking to occur.

3) When used in a belt drive system that includes an autotensioner. The autotensioner generally works to keep the belt tension of the belt drive system constant. However, when an excessive transient variation occurs in the tension of the belt, the autotensioner may impose an impulsive load on the rotating machines of the belt drive system, thereby inducing a collision between the components of a rolling bearing employed in one of the rotating machines.

4) When used in a belt drive system in which a Poly-V belt is employed. With the Poly-V belt, the belt tension is generally set tight, thus imposing high load on the shafts of rotating machines of the belt drive system. The high load may induce a collision between the components of a rolling bearing employed in one of the rotating machines, thereby causing brittle flaking to occur in the rolling bearing.

Second Embodiment

This embodiment provides a rolling bearing assembly $3b1$ that has almost the same structure as the rolling bearing assembly 3 according to the first embodiment. Accordingly, only the differences in structure therebetween will be described below.

In the rolling bearing assembly 3 of the first embodiment, the metal core 36 of one of the seals 35 is made of a magnet, and all the inner ring 31, outer ring 32, and rolling elements 33 are made of a magnetic material.

In comparison, in the rolling bearing assembly $3b1$ of the present embodiment, all the rolling elements 33 are made of a magnet, and only the inner ring 31 is made of a magnetic material.

With such a configuration, magnetic attraction is caused between the rolling elements 33 and the inner ring 31, thereby avoiding any collision between the rolling elements 33 and the inner and outer rings 31 and 32.

Third Embodiment

This embodiment provides a rolling bearing assembly $3b2$ that has almost the same structure as the rolling bearing assembly 3 according to the first embodiment. Accordingly, only the differences in structure therebetween will be described below.

In the rolling bearing assembly 3 of the first embodiment, the metal core 36 of one of the seals 35 is made of a magnet, and all the inner ring 31, outer ring 32, and rolling elements 33 are made of a magnetic material.

In comparison, in the rolling bearing assembly $3b2$ of the present embodiment, all the rolling elements 33 are made of a magnet, and only the outer ring 32 is made of a magnetic material.

With such a configuration, magnetic attraction is caused between the rolling elements 33 and the outer ring 32, thereby avoiding any collision between the rolling elements 33 and the inner and outer rings 31 and 32.

Fourth Embodiment

This embodiment provides a rolling bearing assembly $3b3$ that has almost the same structure as the rolling bearing assembly 3 according to the first embodiment. Accordingly, only the differences in structure therebetween will be described below.

In the rolling bearing assembly 3 of the first embodiment, the metal core 36 of one of the seals 35 is made of a magnet, and all the inner ring 31, outer ring 32, and rolling elements 33 are made of a magnetic material.

In comparison, in the rolling bearing assembly $3b3$ of the present embodiment, the inner ring 31 is made of a magnet, and all the rolling elements 33 are made of a magnetic material.

With such a configuration, magnetic attraction is caused between the inner ring 31 and the rolling elements 33, thereby avoiding any collision between the rolling elements 33 and the inner and outer rings 31 and 32.

Fifth Embodiment

This embodiment provides a rolling bearing assembly $3b4$ that has almost the same structure as the rolling bearing assembly 3 according to the first embodiment. Accordingly, only the differences in structure therebetween will be described below.

In the rolling bearing assembly 3 of the first embodiment, the metal core 36 of one of the seals 35 is made of a magnet, and all the inner ring 31, outer ring 32, and rolling elements 33 are made of a magnetic material.

In comparison, in the rolling bearing assembly $3b4$ of the present embodiment, the outer ring 32 is made of a magnet, and all the rolling elements 33 are made of a magnetic material.

With such a configuration, magnetic attraction is caused between the outer ring 32 and the rolling elements 33, thereby avoiding any collision between the rolling elements 33 and the inner and outer rings 31 and 32.

Sixth Embodiment

Figure 5:
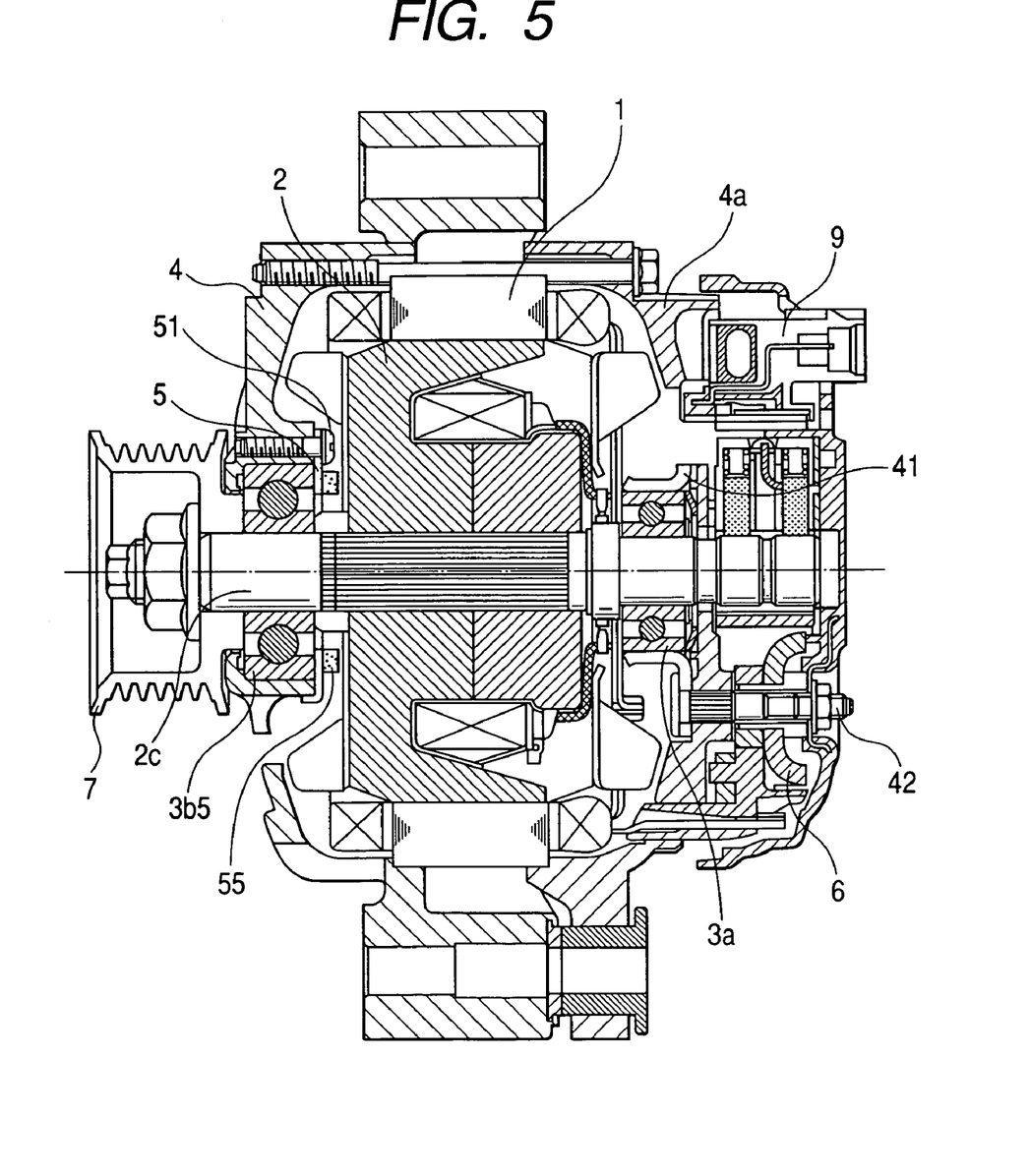
FIG. 5 is a partially cross-sectional view of an automotive alternator in which a rolling bearing assembly according to the sixth embodiment of the invention is incorporated.

This embodiment provides a rolling bearing assembly $3b5$ that has almost the same structure as the rolling bearing assembly 3 according to the first embodiment. Accordingly, only the differences in structure therebetween will be described below.

In the first embodiment, the rolling bearing assembly 3 includes the inner and outer rings 31 and 32, the rolling elements 33, the cage 34, and the seals 35. Further, the metal core 36 of one of the seals 35 is made of a magnet, and all the inner ring 31, outer ring 32, and rolling elements 33 are made of a magnetic material.

In the present embodiment, the rolling bearing assembly $3b5$ includes a magnet 55 in addition to the inner and outer rings 31 and 32, the rolling elements 33, the cage 34, and the seals 35.

The magnet 55 has, as shown in FIG. 5, a ring shape and is mounted to the plate-shaped bearing retainer 5. More specifically, the bearing retainer 5 has opposite side faces that are perpendicular to the shaft 2c of the rotor 2. To one of the side faces, the magnet 55 is mounted; to the other, all other components of the rolling bearing assembly 3b5 are mounted.

Further, the inner and outer rings 31 and 32 and rolling elements 33 of the rolling bearing assembly 3b5 are made of a magnetic material. Moreover, the bearing retainer 5 is also made of a magnetic material.

With such a configuration, the magnet 55 magnetizes the inner and outer rings 31 and 32 and the rolling elements 33, thereby causing magnetic attraction between the rolling elements 33 and the inner and outer rings 31 and 32.

The magnetic attraction enables the rolling elements 33 to keep constant radial and axial distances with the inner and outer rings 31 and 32, thereby avoiding any collision therebetween.

Seventh Embodiment

Figure 6:
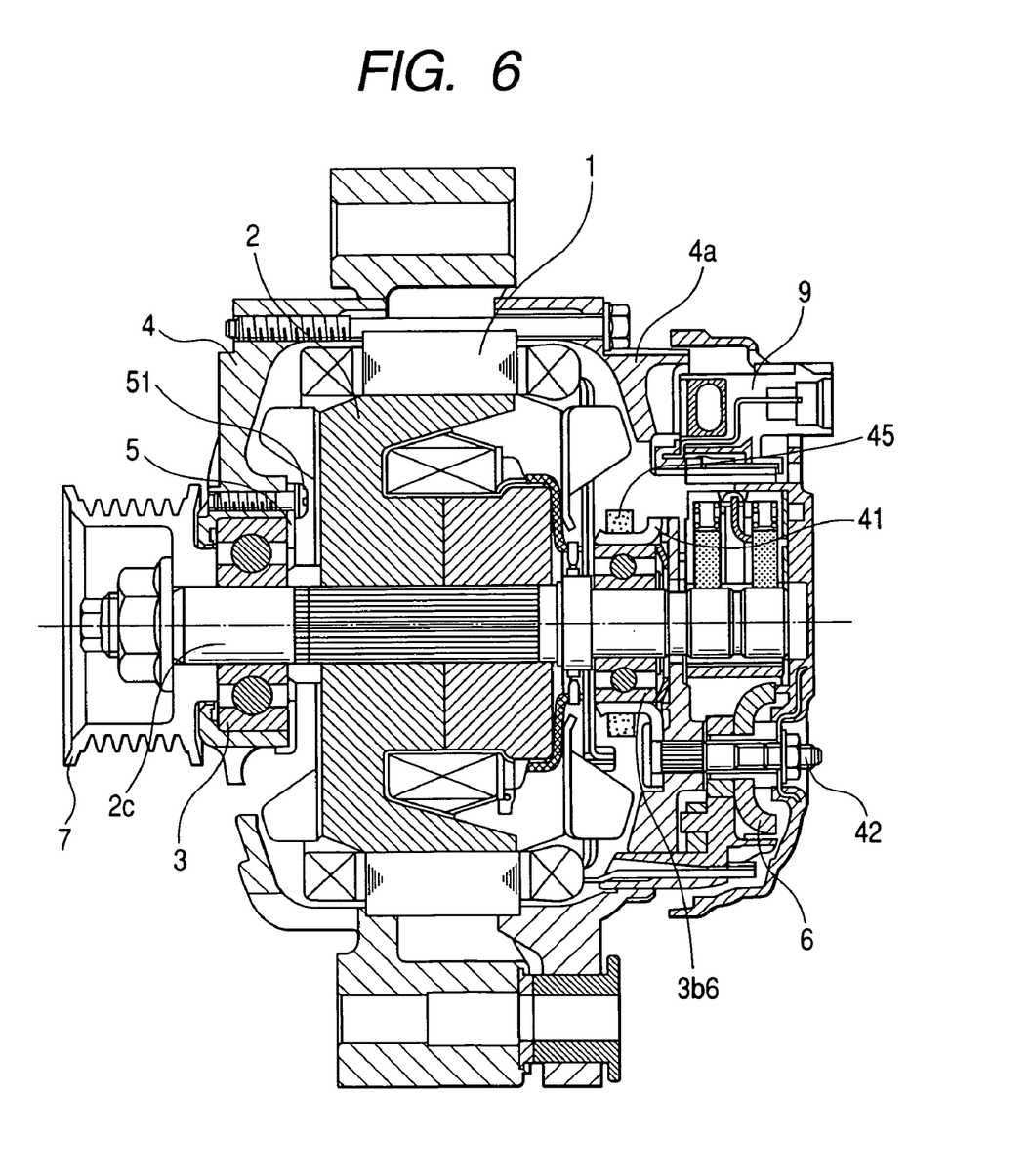
FIG. 6 is a partially cross-sectional view of an automotive alternator in which a rolling bearing assembly according to the seventh embodiment of the invention is incorporated.

This embodiment provides a rolling bearing assembly 3b6 that has almost the same structure as the rolling bearing assembly 3 according to the first embodiment. Accordingly, only the differences in structure therebetween will be described below.

In the first embodiment, the rolling bearing assembly 3 includes the inner and outer rings 31 and 32, the rolling elements 33, the cage 34, and the seals 35. Further, the metal core 36 of one of the seals 35 is made of a magnet, and all the inner ring 31, outer ring 32, and rolling elements 33 are made of a magnetic material.

In the present embodiment, the rolling bearing assembly 3b6 includes a magnet 45 in addition to the inner and outer rings 31 and 32, the rolling elements 33, the cage 34, and the seals 35.

The magnet 45 has, as shown in FIG. 6, a ring shape and is mounted on the outer surface of the bearing box 41 in which all other components of the rolling bearing assembly 3b6 are mounted.

Further, the outer ring 32 and rolling elements 33 of the rolling bearing assembly 3b6 are made of a magnetic material. Moreover, the bearing box 41 is also made of a magnetic material.

With such a configuration, the magnet 45 magnetizes the outer ring 32 and the rolling elements 33, thereby causing magnetic attraction between the outer ring 32 and the rolling elements 33. The magnetic attraction makes it possible to avoid any collision between the rolling elements 33 and the inner and outer rings 31 and 32.

While the above particular embodiments of the invention have been shown and described, it will be understood by those who practice the invention and those skilled in the art that various modifications, changes, and improvements may be made to the invention without departing from the spirit of the disclosed concept.

For example, in the previous embodiments, the rolling elements 33 each have a ball shape. However, the rolling elements 33 may have other shapes, such as a cylindrical shape.

Moreover, in the previous embodiments, the rolling bearing assemblies are employed in an automotive alternator. However, the rolling bearing assemblies may also be employed in any other rotary machines.

Such modifications, changes, and improvements within the skill of the art are intended to be covered by the appended claims.

What is claimed is:

1. A rolling bearing assembly that is employed in an automotive accessory to support a shaft of the accessory, the automotive accessory includes:

a plate-shaped bearing retainer that is made of a magnetic material and has first and second side faces disposed perpendicular to an axial direction of the accessory; and the rolling bearing assembly that comprises:

an inner ring that is made out of a magnetic material and mounted to the first side face of the bearing retainer;

an outer ring that is made out of a magnetic material and mounted to the first side face of the bearing retainer;

a plurality of rolling elements that are made out of a magnetic material and mounted to the first side face of the bearing retainer and interposed between the inner and outer rings; and a magnet that has a ring shape and is mounted to the second side face of the bearing retainer to cause magnetic attraction between the rolling elements and at least one of the inner and outer rings.

2. The rolling bearing assembly as set forth in claim 1, wherein the automotive accessory is an automotive alternator.

3. The rolling bearing assembly as set forth in claim 1, wherein the automotive accessory is driven by an automotive engine in a serpentine belt drive system.

4. The rolling bearing assembly as set forth in claim 3, wherein the automotive engine drives four or more automotive accessories in the serpentine belt drive system.

5. The rolling bearing assembly as set forth in claim 1, wherein the automotive accessory is driven by an automotive engine in a belt drive system that includes an autotensioner.

6. The rolling bearing assembly as set forth in claim 1, wherein the automotive accessory is driven by an automotive engine via a Poly-V belt.

7. A rolling bearing assembly that is employed in an automotive accessory to support a shaft of the accessory, the automotive accessory includes:

a hollow cylindrical bearing box that is made of a magnetic material and extends in an axial direction of the accessory, and the rolling bearing assembly that comprises:

an inner ring that is mounted in the bearing box;

an outer ring that is made out of a magnetic material and is mounted in the bearing box;

a plurality of rolling elements that are made out of a magnetic material and are mounted in the bearing box interposed between the inner and outer rings; and a magnet that has a ring shape and is mounted on an outer surface of the bearing box to cause magnetic attraction between the rolling elements and at least one of the inner and outer rings.

8. The rolling bearing assembly as set forth in claim 7, wherein the automotive accessory is an automotive alternator.

9. The rolling bearing assembly as set forth in claim 7, wherein the automotive accessory is driven by an automotive engine in a serpentine belt drive system.

10. The rolling bearing assembly as set forth in claim 9, wherein the automotive engine drives four or more automotive accessories in the serpentine belt drive system.

11. The rolling bearing assembly as set forth in claim 7, wherein the automotive accessory is driven by an automotive engine in a belt drive system that includes an autotensioner.

12. The rolling bearing assembly as set forth in claim 7, wherein the automotive accessory is driven by an automotive engine via a Poly-V belt.

* * * * *